INVENTOR.
LOUIE BOGDANOVICH

July 26, 1955  L. BOGDANOVICH  2,713,879
MACHINE FOR CUTTING FOOD INTO CHUNKS
Filed May 19, 1953  3 Sheets-Sheet 2

INVENTOR.
LOUIE BOGDANOVICH
BY
Mellin and Hanscom
ATTORNEYS

July 26, 1955          L. BOGDANOVICH          2,713,879
MACHINE FOR CUTTING FOOD INTO CHUNKS
Filed May 19, 1953                            3 Sheets-Sheet 3
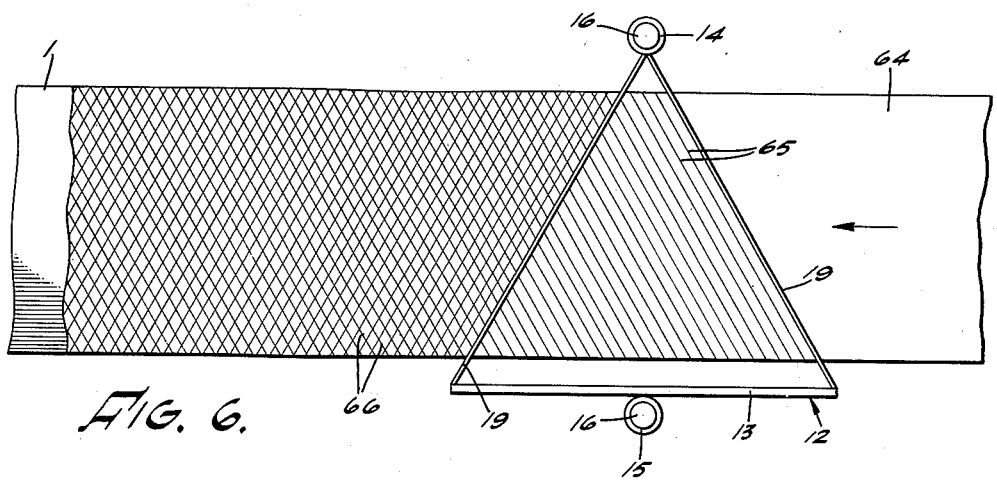
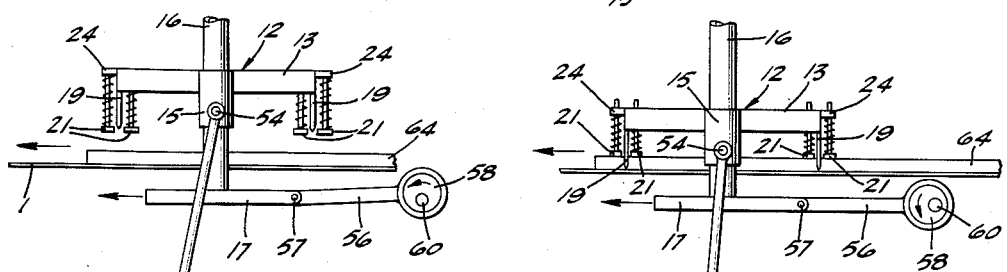
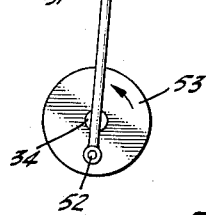
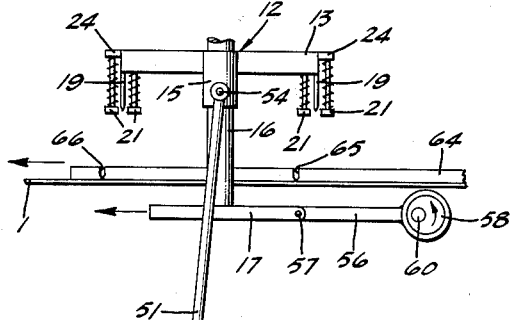
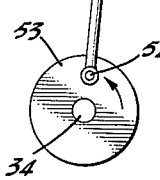
INVENTOR.
LOUIE BOGDANOVICH
BY
Mellen and Hanscom
ATTORNEYS

United States Patent Office 2,713,879
Patented July 26, 1955

2,713,879
MACHINE FOR CUTTING FOOD INTO CHUNKS

Louie Bogdanovich, San Pedro, Calif., assignor to The French Sardine Company of California, Terminal Island, Calif., a corporation of California Application May 19, 1953, Serial No. 356,069

2 Claims. (Cl. 146—78)

This invention relates to food chopping devices, and particularly to a machine for cutting materials, such as fish, into relatively small chunks.

It is among the objects of my invention to provide a machine for chopping food materials, such as loins of cooked tuna fish, into small chunks.

Another object is to provide cutting mechanism, operating in conjunction with a moving conveyor, for continuously cutting material carried by the conveyor past the cutting mechanism.

Another object is to provide cutting mechanism wherein a pair of cutting blades are positioned to extend across a conveyor at different angles, so as to cut material in diamond shaped chunks as the material is moved past the blades.

A further object is to provide a food chopping machine provided with gripper plates mounted along the sides of cutting blades and yieldably movable to engage and hold material against a moving conveyor while the cutting blades are pressed past the plates and through the material upon the conveyor.

It is also an object of my invention to provide mechanism wherein the cutters and grippers are moved with the conveyor during the cutting stroke, and in an opposite direction during the recovery stroke of the cutting blades.

The invention has other objects and features of advantage, some of which with the foregoing will be explained in the following description of that form of the invention illustrated in the drawings. It is understood that the invention is not limited to the embodiment shown in the drawings, but may be embodied in other forms as set forth in the claims.

In the drawings:

Fig. 6 is a plan view illustrating diagrammatically the manner in which the cutting blades cut material carried thereunder by the conveyor.

Figs. 7, 8 and 9 are elevational views illustrating somewhat diagrammatically, the relationships of the cutters, conveyor, and cutter actuating means at different points during a cycle of operation.

Figures 1, 2:
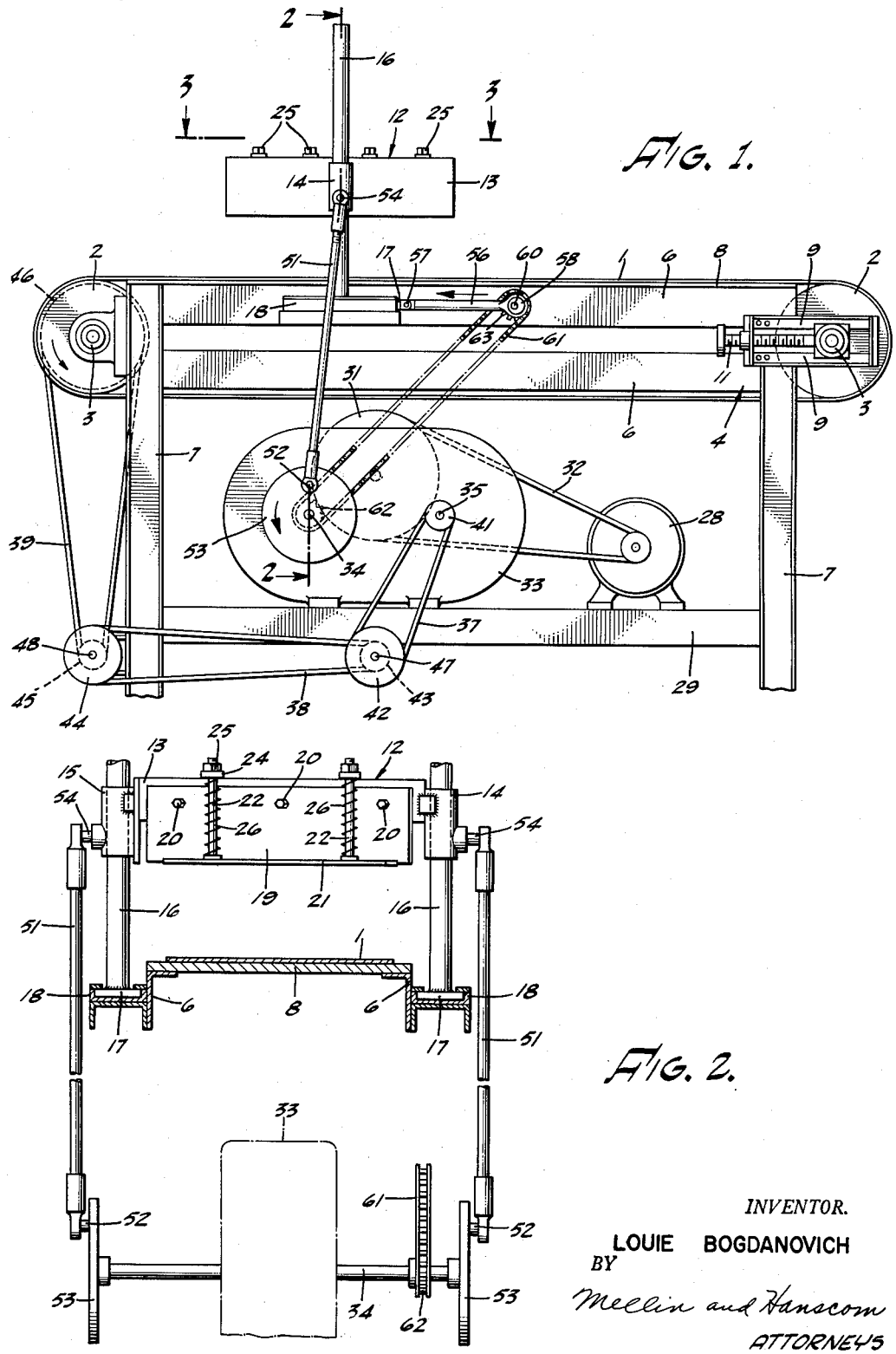
Fig. 1 is a side elevational view illustrating one embodiment of the food chopping mechanism of my invention.
Fig. 2 is a transverse sectional view, parts being broken away, and parts being shown in elevation, the plane of the section being indicated by the line 2—2 of Fig. 1.

In terms of broad inclusion, the food chopping mechanism of my invention comprises a cutterhead mounted for reciprocating movement normal to a conveyor on which material is moved under the cutterhead to be cut by blades carried by the head. The cutterhead is also reciprocated parallel to the conveyor with the head advancing with the conveyor during the cutting stroke, and moving in the opposite direction during the recovery stroke of the head. The invention also contemplates a pair of cutting blades extending across the conveyor at different angles, for cutting material into small diamond shaped chunks; and grippers yieldable mounted adjacent the sides of the blades, the grippers being movable to hold material in place during the cutting stroke and to displace material clinging to the cutters during their return stroke.

In terms of greater detail, the chopping device of my invention comprises an endless belt conveyor 1 operable over pulleys 2 journaled as at 3 upon the ends of a frame designated in general by the numeral 4. The frame comprises longitudinally extending frame members 6 supported by leg member 7. A top plate 8 is mounted upon the longitudinal frame members 6 to provide a firm level support for the upper reach of the conveyor belt 1. The journals 3 at one end of the conveyor are adjustably mounted upon guide members 9, and an adjusting screw 11 is mounted in conjunction with the guide members at each side of the machine for moving the journals 3 and pulleys 2 longitudinally to maintain the conveyor 1 under a desired degree of tension.

A cutterhead designated in general by the numeral 12, is mounted over the conveyor 1. The cutterhead comprises a triangular frame 13 provided with bearing portions 14 and 15 slidably movable along guide rods 16 projecting upwardly above the conveyor at opposite sides thereof. The guide rods 16 are secured to crossheads 17 slidably mounted for movement within guides 18 upon the sides of the conveyor frame members 6 at a cutting station intermediate the ends of the conveyor. The head frame 12 is preferably in the form of an equilateral triangle, the bearing portion 14 being positioned at an apex, and the bearing portion 15 being positioned at the middle of the opposite side.

Figure 3:
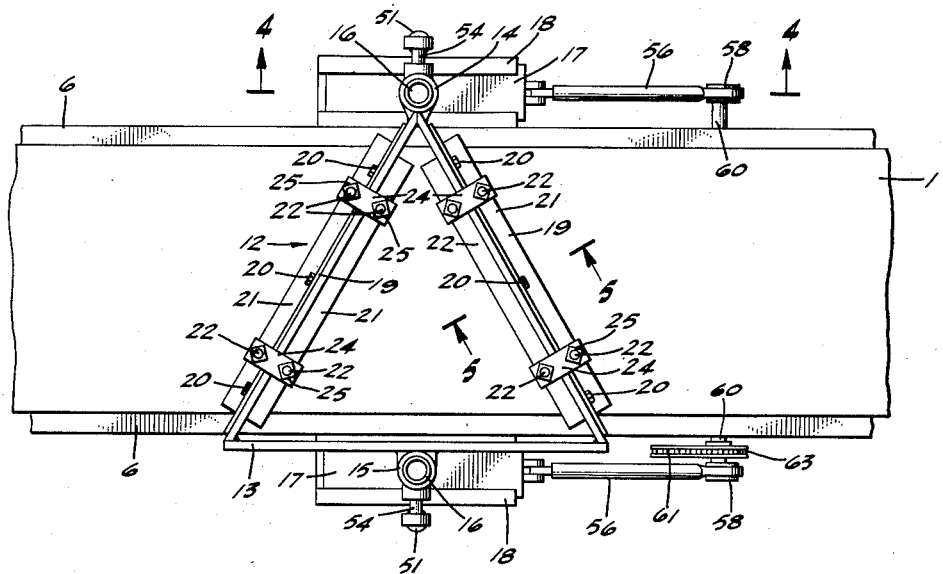
Fig. 3 is a plan view of the cutterhead and actuating mechanism therefor, viewed as indicated by the arrows 3—3 of Fig. 1.
Figure 4:
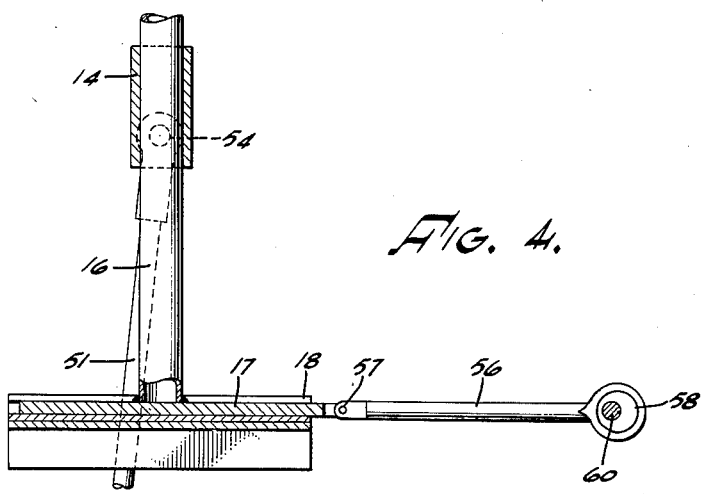
Fig. 4 is an enlarged sectional detail view of the cutterhead actuating mechanism, the plane of the section being indicated by the line 4—4 of Fig. 3.
Figure 5:
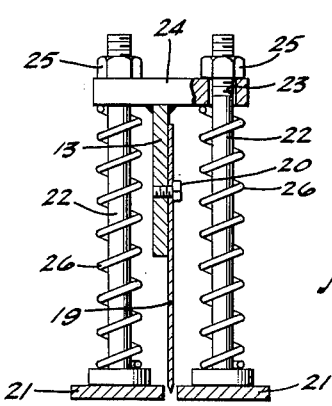
Fig. 5 is an enlarged sectional detail view illustrating the relationship of a blade and the gripper plate associated therewith upon the cutterhead, the plane of the section being indicated by the line 5—5 of Fig. 3.

Blades 19, having sharpened cutting edges, are secured to the frame members, which diverge from the bearing portion 14 at one side of the conveyor, by machine screws 20 or other suitable securing means. The cutting blades extend across the conveyor in diverging relationship as shown in Figs. 3 and 6.

A pair of gripper plates 21 are mounted along the sides of each cutting blade 19, the plates 21 being spaced to permit movement of the lower edge of the blades therebetween. The plates 21 are secured to the lower ends of rods 22 slidably movable through guide openings 23 formed in supports 24 welded or otherwise secured to the diverging frame members 13 and extending laterally from opposite sides thereof. Nuts 25 are threaded onto the upper end of the rods 22, and springs 26 are mounted over the rods to yieldably press the gripper plates downwardly to the limit of their movement as adjusted by the nuts 25.

The conveyor and cutter mechanism is operated by a motor 28 mounted upon a shelf 29 supported by the frame legs 7 below the conveyor 1. The motor 28 is connected to an appropriate drive mechanism, including a drive pulley 31, by a belt 32.

The drive pulley 31 is mounted upon a transmission housing 33 mounted upon the shelf 29. The housing contains a set of meshing gears for operating a cutterhead drive shaft 34 and a conveyor drive shaft 35. Since the form and the ratio of the gears may be varied within wide limits, and the transmission is of conventional nature, a detailed disclosure of the transmission gears is omitted herefrom.

As illustrated, the shaft 35 drives the conveyor 1 through a series of belt and pulley connections including belts 37, 38 and 39 operating over pulleys 41, 42, 43, 44, 45 and 46, as best illustrated in Fig. 1 of the drawings, wherein the belt 37 is shown to engage the pulleys 41 and 42, the belt 38 to engage pulleys 43 and 44, and the belt 39 to engage pulleys 45 and 46. The pulleys 42 and 43 are mounted upon a jack shaft 47 and pulleys 44 and 45 are mounted upon a jack shaft 48, suitably journaled on the frame 4.

The cutterhead 12 is reciprocated vertically above the conveyor 1 along the guides 16 by means of connecting rods 51 pivotally connected to eccentric pins 52 carried by drive plates 53 upon the ends of the shaft 34. At their upper ends, the connecting rods 51 are connected to the bearing portions 14 and 15 through pivot pins 54.

The crossheads 17 upon which the guide rods 16 are mounted are actuated by connecting rods 56 engaging pivot pins 57 upon the crossheads, and eccentrics 58 mounted upon a drive shaft 60. The drive shaft 34 is connected to the shaft 60 by means of a chain 61, or other suitable drive connection, operating over sprockets 62 and 63.

In operation, food material to be chopped, as for example loins of cooked tuna fish, illustrated diagrammatically in Figs. 7, 8 and 9 is supplied onto the conveyor 1 in advance of the cutterhead 12, for movement under said cutterhead. As the material is advanced by the conveyor 1, the cutterhead 12 is reciprocated vertically upon the guides 16 by means of the connecting rods 51. When the head 12 is in its uppermost position, as indicated in Fig. 9 of the drawings, the blades 19 and gripper plates 21 are positioned well above the material 64 carried by the conveyor 1. As the eccentric pin 52 is moved downwardly by the rotation of plate 53, the blades are moved downwardly by the rods 51, and are pressed through the material carried by the conveyor, as indicated in Fig. 8. At the same time, the gripper plates 21 upon opposite sides of each blade 19 are moved downwardly against the upper surface of the material to be cut, and exert a gripping pressure thereon as the blades 19 are moved further to their lowermost position. The springs 26 yield under the pressure resulting from downward movement of the head after the gripper plates seat upon the surface of the material 64.

During the downward movement of the blades 19 and gripper plates 21, the cutterhead is moved bodily forward parallel to the movement of the conveyor 1, and at the same rate. This is accomplished by the movement of the crossheads 17 along the guides 18 by the connecting rods 56 and eccentric 58. At the end of the downward cutting movement of the blades 19, and as the blades start their recovery movement, the crossheads begin their return movement. As the cutting blades 19 clear the material, the gripper plates release the material and permit it to be advanced by the conveyor 1 while the cutterhead is moved in the opposite direction to the limit of its rearward movement.

This operation of the cutterhead causes the blades 19 to cut the material 64 into diamond shaped chunks, as illustrated diagrammatically in Fig. 6 of the drawings. As the material 64 is moved under the first cutting blade 19, it is cut through at intervals along lines 65 extending angularly across the conveyor as indicated in Fig. 6. As the material reaches and passes the second cutting blade, the material is again cut through at intervals along lines 66 extending across the conveyor at an angle to the cuts first made. This results in severing the material into diamond shaped chunks which are carried on by the conveyor to its delivery end, where it is delivered to apparatus for further treatment, as for example, canning apparatus such as disclosed in a copending application.

In Fig. 7 of the drawings, the cutterhead 12 is shown in a position about midway of its downward or cutting stroke. In Fig. 8, the cutting blades are shown in their lowermost position, with the material cut through to the plane of the upper surface of the conveyor 1. As the eccentrics 53 and 58 are further rotated in an anti-clockwise direction, the head 12 is raised and moved rearwardly to the position indicated in Fig. 9 of the drawings.

The operation is timed with respect to the movement of the conveyor 1, so that the material 64 may be cut into chunks of desired size. The pressure of the gripper plates 21 holds the material 64 firmly against the conveyor 1 as the cutting blades are forced downwardly through the material. During the upward movement of the blades 19, any material tending to cling to the blades is displaced by the plates 21 between which the blades move. The material 64 may be fed onto the conveyor 1 manually, or by mechanical means, so as to cause a substantially continuous stream of material to be fed past the cutting head to be delivered in chopped condition from the delivery end of the conveyor 1.

Having thus described my invention, what I claim and desire to secure by Letters Patent is:

1. A food chopping machine comprising a frame, an endless conveyor mounted on said frame for carrying material past a cutting station, a pair of crossheads slidably mounted on said frame one adjacent each side of said conveyor in opposed relation, said crossheads being guided for rectilinear movement parallel to said conveyor, a guide connected to each of said crossheads and extending above said conveyor, the axis of said guides being normal to the plane of said conveyor, a cutterhead slidably mounted on said guides, a pair of knives mounted on said cutterhead, said knives being arranged in the form of a V with the point of the V adjacent one of said guides and the open end symmetrically disposed adjacent the other, a pair of eccentric cams mounted on said frame one adjacent each side of conveyor, a link connecting each of said eccentric cams with one of the crossheads, a pair of crank members mounted on said frame below said conveyor one adjacent each side thereof, a pair of connecting rods connecting said crank members with said cutterhead, and drive means operatively connected to drive said conveyor and said eccentric cams and said cranks in timed relation with each other, whereby said cutterhead is moved with said conveyor at the same speed during its downward cutting stroke and in the opposite direction during its upward return stroke.

2. A food chopping machine comprising a frame, an endless conveyor mounted on said frame for carrying material past a cutting station, a pair of crossheads slidably mounted on said frame one adjacent each side of said conveyor in opposed relation, said crossheads being guided for rectilinear movement parallel to said conveyor, a guide connected to each of said crossheads and extending above said conveyor, the axis of said guides being normal to the plane of said conveyor, a cutterhead slidable mounted on said guides, a pair of knives mounted on said cutterhead, said knives being arranged in the form of a V with the point of the V adjacent one of said guides and the open end symmetrically disposed adjacent the other, a pair of gripper plates yieldably mounted adjacent each knife, the plates of each pair being in a plane slightly below the cutting edge of the knife and spaced to permit sliding movement of a blade therebetween into and out of engagement with material carried by the conveyor, a pair of eccentric cams mounted on said frame one adjacent each side of said conveyor, a link connecting each of said eccentric cams with one of the crossheads, a pair of crank members mounted on said frame below said conveyor one adjacent each side thereof, a pair of connecting rods connecting said crank members with said cutterhead, and drive means operatively connected to drive said conveyor and said eccentric cams and said cranks in timed relation with each other, whereby said cutterhead is moved with said conveyor at the same speed during its downward cutting stroke and in the opposite direction during its upward return stroke.

References Cited in the file of this patent

UNITED STATES PATENTS

| | | |
|---|---|---|
| 164,767 | Rochow | June 22, 1875 |
| 1,610,236 | Ayars | Dec. 14, 1926 |
| 2,130,937 | Urschel | Sept. 20, 1938 |
| 2,145,770 | Lovell | Jan. 31, 1939 |

FOREIGN PATENTS

| | | |
|---|---|---|
| 15,283 | Germany | Nov. 11, 1881 |